United States Patent [19]

Ogawa et al.

[11] Patent Number: 5,013,603

[45] Date of Patent: May 7, 1991

[54] INK JET RECORDING PAPER WITH AMORPHOUS SILICA FILLER

[75] Inventors: Masahide Ogawa; Teiji Sato, both of Shibata; Masao Takahashi, Shiunji; Toshio Kitsu, Shibata; Seikichi Takahashi, Nakajo; Kinichi Ono, Kurokawa, all of Japan

[73] Assignee: Mizusawa Industrial Chemicals, Ltd., Tokyo, Japan

[21] Appl. No.: 468,140

[22] Filed: Jan. 22, 1990

Related U.S. Application Data

[62] Division of Ser. No. 205,445, Jun. 9, 1988, Pat. No. 4,915,923.

[51] Int. Cl.$^5$ ............................................. B41M 5/00
[52] U.S. Cl. .............................. 428/331; 346/135.1; 428/207; 428/211; 428/342
[58] Field of Search ...................... 346/135.1; 428/195, 428/207, 211, 331, 342

[56] References Cited

U.S. PATENT DOCUMENTS

| | | | |
|---|---|---|---|
| 4,758,461 | 7/1988 | Akiya et al. | 428/212 |
| 4,910,084 | 3/1990 | Yamasaki et al. | 428/195 |
| 4,915,923 | 4/1990 | Ogawa et al. | 106/482 |

*Primary Examiner*—Pamela R. Schwartz
*Attorney, Agent, or Firm*—Spensley, Horn, Jubas & Lubitz

[57] ABSTRACT

Disclosed is a filler for ink jet recording paper, said filler being composed of amorphous silica having a median diameter, measured by the coulter counter method, of 2 to 15 μm, an oil absorption of at least 180 ml/100 g, a refractive index, measured by the solvent method, of at least 1.450, and a moisture absorption, measured when it is caused to absorb moisture for 200 hours at a relative humidity of 90% and a temperature of 25° C., of at least 35%.

5 Claims, 3 Drawing Sheets

INK JET RECORDING PAPER WITH AMORPHOUS SILICA FILLER

This is a division of application Ser. No. 07/205,445, filed on Jun. 9, 1988 now U.S. Pat. No. 4,915,923.

BACKGROUND OF THE INVENTION

1. Field of the Invention

This invention relates to a filler for ink jet recording paper. More specifically, it relates to an amorphous silica filler capable of giving recording paper on which ink jet printing can produce dots having excellent circularity and clear and vivid colors.

2. Description of the Prior Art

Ink jet recording has various advantages such as reduced noises, high-speed recording and the ease of multi-color printing, and has found use in various printers and facsimile devices. Ordinary high-quality paper or coated paper is difficult to use as recording sheets in this application because of its insufficient properties. Recording sheets used for this purpose should meet various requirements. For example, ink droplets adhering to a sheet surface should be absorbed rapidly within the sheet. Spreading or blurring of ink droplets on the sheet surface should be suppressed. Clear images having a significant density should be produced on the sheet surface, and these images should have excellent fastness characteristics.

It has been proposed to coat or include various inorganic solid substances, optionally together with binders, on a paper surface or within the paper in order to impart these characteristics to the surface of the paper substrate. For example, it has already been known to use synthetic silica and/or its salt (Japanese Laid-Open Patent Publication No. 157786/1982), apply a weak acid salt or an oxide of a divalent metal such as magnesium or zinc as a coated layer (Japanese Laid-Open Patent Publication No. 94491/1983), include natural zeolite, synthetic zeolite, diatomaceous earth, synthetic mica, etc. in a coated layer (Japanese Laid-Open Patent Publication No. 68292/1984), and use clay, talc, calcium carbonate, kaolin, acid terra abra, activated terra abra, etc. as a white pigment forming an ink absorbing layer (Japanese Lain-Open Patent Nos. 89391/1983 and 95188/1984).

It is never sufficient, however, for fillers in ink jet recording sheets, to merely absorb ink. A certain fixed balance is required between absorption of the entire ink or absorption of water or a solvent and absorption of a dye. For example, when ink is absorbed rapidly in the filler layer, spreading or blurring of ink drops will be prevented. But since the dye also permeates through the filler layer, the resulting image tends to lack clearness or vividness and a proper density. It will be understood therefore that it is by no means easy in ink jet recording to satisfy simultaneously the requirement of preventing spreading or blurring of ink droplets and the requirement of increasing the density and clearness or vividness of images.

Ink for ink jet printing is generally a composition comprising a dye dissolved in a medium containing water and a small amount of an organic solvent. Fillers heretofore used are not fully satisfactory in respect of a balance of adsorption of various components in the ink. For example, if the adsorption speed of the dye is too high, the dot diameter decreases, and white spots occur in the solid portion. If the adsorption speed of the dye is too low, dot circularity cannot be obtained.

SUMMARY OF THE INVENTION

It is an object of this invention to provide a filler for ink jet recording paper which can simultaneously satisfy the requirement of preventing spreading or blurring of ink droplets and the requirement of increasing the density and the clearness or vividness of images in ink jet recording.

We have now succeeded in synthesizing amorphous silica having a refractive index, measured by a solvent method, of 1.45 to 1.47 which is higher than those of silicas generally used heretofore and excellent adsorption characteristics, and found that the above object is achieved by using this amorphous silica as a filler for ink jet recording paper.

The present invention thus provides a filler for ink jet recording paper, said filler being composed of amorphous silica having a median diameter, measured by the coulter counter method, of 2 to 15 $\mu$m, an oil absorption of at least 180 ml/100 g, a refractive index, measured by the solvent method, of at least 1.450, and a moisture absorption, measured when it is caused to absorb moisture for 200 hours at a relative humidity of 90% and a temperature of 25° C., of at least 35%.

DETAILED DESCRIPTION OF THE PREFERRED EMBODIMENTS

The present invention is based on the finding that amorphous silica having the aforesaid combination of properties is outstandingly superior as a filler for ink jet recording paper from the standpoint of maintaining a high image density and clearness or vividness and preventing ink dot spreading or blurring.

This amorphous silica is markedly characterized by the fact that it has a very high refractive index of at least 1.450, especially 1.460 to 1.470, which is equal to, or higher than, the refractive index of quartz glass, and yet shows a high oil absorption of at least 180 ml/100 g and a moisture absorption, when caused to absorb moisture for 200 hours at a relative humidity of 90% and a temperature of 25° C. (unless otherwise specified, all moisture absorptions hereinafter are measured under these conditions), of at least 35%.

Wet-method silica and dry-method silica have previously been known as amorphous silica. The wet-method silica is obtained by neutralizing a sodium silicate solution with a mineral acid such as sulfuric acid, and the dry-method (gaseous phase-method) silica, by decompositing silicon tetrachloride in the gaseous phase. The wet-method silica has relatively high absorption characteristics but mostly has a refractive index of less than 1.450. The gaseous phase-method silica has a relatively high oil absorption, but poor hygroscopicity as shown by its moisture absorption of less than about 10%.

The amorphous silica used in the present invention can be obtained by mixing an acidic sol of silica with basic aluminum sulfate to form a high temperature-curable sol, hardening the sol to a gel, and subjecting the gel to steps including acid-treatment, ammonia treatment, washing with water and drying, and uniquely has a combination of a high refractive index, a high oil absorption and a high moisture absorption. Its production, however, is not limited to this method.

By using the amorphous silica defined by this invention as a filler for ink jet recording paper, an image having a high density and high clearness or vividness can be obtained without blurring. The reason for this may be theorized as follows although the invention is in no way confined by this theory. Since the amorphous silica used in this invention has a high oil absorption, it has the excellent property of holding the ink applied as a jet on the surface of the particles or among the particles and consequently serves to prevent dot blurring or spreading effectively. In addition, since this amorphous silica shows a high moisture absorption under high-humidity conditions, it has the great action of drawing water into the inside of the particles from the ink layer held on the surface of the particles and thus a dense dye layer is formed on the surface of the amorphous silica particles. Furthermore, since the refractive index of the amorphous silica particles is high, multiple scattering or reflection occurs in the interface between the dye layer and the amorphous silica particles in the amorphous silica particles carrying the dye layer. Consequently, the density of the image increases, and the increased lightness or chroma leads to an improvement in clearness lightness or chroma leads to an improvement in clearness or vividness.

That the amorphous silica of the invention has an oil absorption of at least 180 ml/100 g, a moisture absorption of at least 35% and a refractive index of at least 1.453 is critical to the achievement of the object of this invention. This will be clearly seen from comparative examples given hereinafter.

The amorphous silica used in this invention has a median diameter, measured by the coulter counter method, of 2 to 15 μm. Its specific particle diameter differs depending upon the end use. Where paper smoothness or dot circularity is required, relatively small diameters within the above range are preferred. When it is desired to increase surface strength of paper and emphasize image clearness or vividness, relatively large diameters within the above range are preferred.

The use of the amorphous silica as a filler for ink jet recording paper brings about some advantages in the fastness characteristics of the dye image over the use of other inorganic compounds such as silicates. The dye contained in the ink is, in may cases, an acid dye or a direct dye. With inorganic fillers containing a metallic component such as magnesium, zinc and aluminum, chemical absorption of the dye rapidly occurs to give an image lacking clearness or vividness. Alternatively, the interaction of the metallic component with the dye tends to cause troubles such as discoloration or fading of the dye. These troubles, however, can be avoided by using amorphous silica.

Method of Producing Amorphous Silica

The amorphous silica used in the invention may be produced by mixing an acidic sol of silica with basic aluminumsulfate to form a high temperature-curable sol, hardening the sol to a gel, and subjecting the gel to steps including acid-treatment, ammonia treatment, washing with water and drying.

The acidic sol of silica is a silica sol having a pH of not more than 3, especially not more than 2.5. In the present specification, the sol means a dispersion of colloidal particles in a medium, in which the colloidal particles are maintained flowable. This concept is in contrast to a gel in which colloidal particles are solidified while occluding the medium. The concentration of the silica sol as $SiO_2$ is 6.0 to 15.0% by weight, especially 9.0 to 13.0%. The acidic sol of silica can be obtained by filling an aqueous solution of a mineral acid such as sulfuric acid in a reaction vessel, adding sodium silica dropwise while the aqueous acid solution is stirred, and maintaining the pH of the mixture after the addition at 3 or less.

The basic aluminum sulfate used preferably has the chemical composition wherein n is a number of 0.5 to 2.8, especially 0.9 to 1.5. The concentration of the basic aluminum sulfate as $Al_2O_3$ is advantageously 6.0 to 13.0% by weight, especially 8.0 to 11.0% by weight. The basic aluminum sulfate can be obtained by partially neutralizing aluminum sulfate with calcium carbonate to the above basicity.

The acidic sol of silica and the basic aluminum sulfate are mixed at the lowest possible temperature, particularly not more than 20° C., to prepare a heat-curable sol. The mixing ratio of the acidic silica sol and the basic aluminum sulfate solution, in terms of the mole ratio of $SiO_2$ to $Al_2O_3$, is desirably from 168:1 to 4:1, especially from 40:a to 7:1.

The sol is heated to produce a hydrogel of silica. Desirably, the heating temperature is generally in the range of 60° to 100° C., especially 80° to 80° C. Desirably, heating is carried out under such conditions that the gelled product is in the form of granules, or in other words, gellation is carried out while the gelled product is granulated. For this purpose, the heat-curable sol may be fed in the form of liquid droplets into a heated water-immiscible medium whereby gellation proceeds to give gelled granules. Another method is to spray the heat-curable sol into a heated gaseous atmosphere to perform gellation and granulation.

The resulting gel is treated with an acid such as sulfuric acid to extract and remove the aluminum component from the gel. The sulfuric acid component in the gel is neutralized with ammonia or the like. The product is washed with water to remove salts as impurities. The product is dried and pulverized to obtain amorphous silica for use in this invention.

Properties of the Amorphous Silica

The amorphous silica used in this invention has an oil absorption (measured in accordance with JIS K-5101-19) of at least 180 ml/100 g, especially at least 200 ml/100 g. In view of its coatability on paper, the amorphous silica desirably should not have too high an oil absorption. If the oil absorption of the amorphous silica is excessively high, the viscosity of the coating slurry becomes too high and the amorphous silica is difficult to coat in a high concentration. Hence, the oil absorption of the silica is desirably not more than 250 ml/100 g.

The amorphous silica used in this invention has a refractive index of at least 1.450, mostly 1.460 to 1.470. As the amorphous silica, it exceptionally has a high refractive index.

The amorphous silica used in this invention has a specific surface area of generally 200 to 500 m$^2$/g, especially 280 to 450 m$^2$/g, and a pore volume, measured by the nitrogen adsorption method, of at least 1.20 cc/g, especially 1.30 to 1.80 cc/g.

It has been found that the amorphous silica obtained by the aforesaid method has a unique acid strength distribution. The amorphous silica is a kind of solid acid. The acid strength distribution of a solid acid can be determined by an n-butylamine titration method using Hammett's indicators. The relation between the acid strength function H$_O$ and the Hammet's indicator is shown as follows:

| H$_0$ | indicator |
|---|---|
| −1.5 | 4-benzeneazodiphenylamine |
| −3.3 | p-dimethylaminoazobenzene |
| −4.8 | Methyl Red |

If with reference to the above table, titration is carried out with 4-benzeneazodiphenylamine as an indicator, the amount of the solid acid having an acid strength function of up to +1.5 is measured. If titration is carried out using p-dimethylaminoazobenzene as the indicator, the cumulative amount of the solid acid having an acid strength function of up to +3.3 can be measured. By performing titration using various indicators, the acid strength distribution of the solid acid can be measured.

The amorphous silica used in this invention has an acid strength distribution such that the amount of the acid at an acid strength function H$_O$ of more than +1.4 and up to +3.3 is not more than 0.05 millimole/g, and the amount of the acid at an acid strength function H$_O$ of more than +3.3 and up to +4.8 is at least 0.20 millimole/g. That the number of acid sites having a high acid strength is small means that there is less occurrence of discoloration or fading due to the interaction of the acid sites with the dye (the interaction between the acid sites and the auxochrome of the dye). That the number of acid sites having a low acid strength is large means that adsorption and fixation of the dye are performed effectively.

Ink Jet Recording Paper

According to this invention, an ink jet recording element is prepared by providing a layer of the amorphous silica described above on the surface of a support such as paper, or including the amorphous silica into the substrate. To provide a coated layer of this filler on the surface of the substrate, an aqueous slurry containing 5 to 40% by weight, particularly 10 to 25% by weight, of the filler and as required, 1 to 15% by weight, especially 2 to 10% by weight, of a binder is prepared, and coated on the substrate so that the rate of the filler applied is 3 to 20 g/m$^2$ especially 5 to 15 g/m$^2$, followed by drying.

The binder used for this purpose is advantageously an aqueous binder. Examples include water-soluble binders such as carboxymethyl cellulose, ethyl cellulose, hydroxyethyl cellulose, starch, carboxymethyl starch, cyanoethylated starch, casein, gum arabic, tragacanth gum, dextrin, polyvinyl alcohol, vinyl ether/maleic acid copolymer, polyvinyl pyrrolidone and water-soluble acrylic resins; self-emulsifiable binders such as self-emulsifiable acrylic resins; and aqueous latex-type binders such as a styrene/butadiene copolymer latex.

To include the filler into the paper, it is incorporated in a paper-making slurry so that after sheet formation, the filler may be included in the paper fibers in a proportion of 1 to 20% by weight, especially 2 to 10% by weight, based on the weight of the fibers.

If desired, the amorphous silica may be used in combination with another filler known per se such as kaolin, ordinary silica and calcium carbonate in ink jet recording paper.

The use of the amorphous silica having the aforesaid properties as a filler for ink jet recording paper brings about the advantage that a recorded image having a high density and clearness or vividness can be formed on the recording paper without ink blurring or excesive spreading of ink dots. Another advantage that an aqueous coating slurry prepared by using this filler has a low viscosity and lends itself to excellent operability in coating.

The following examples illustrate the present invention more specifically.

EXAMPLES 1a–1c

A cooled diluted solution (8.2 m$^3$) of #3 sodium silicate was reacted with 2.8 m$^3$ of a 40% by weight solution of sulfuric acid at 18° to 20° C. to give 11 m$^3$ of an acid silica sol having a pH of 1.8 and a SiO$_2$ concentration of 11 g/100 ml.

The silica sol was mixed at room temperature with 1.34 m$^3$ of a solution (10% by weight of Al$_2$O$_3$) of basic aluminum sulfate represented by the chemical formula Al$_2$(SO$_4$)$_{1.2}$(OH)$_{3.6}$ to obtain a mixed sol having a pH of 2.30. The mixed sol was fed in the form of liquid droplets into spindle oil heated to 85° C. through a nozzle, and after heating and gellation, spherical particles of silica hydrogel were obtained.

The silica hydrogel was washed with water, and after the pH was lowered to about 1.0 with sulfuric acid, treated at 80° C. for 30 hours. After washing with water, the pH was increased to 10 with aqueous ammonia, and the treatment was carried out at 80° C. for 3 hours.

The product was throughly washed with water, and the resulting hydrogel was dried and pulverized to give 1.250 kg of a fine powder of silica.

The fine silica powder was fed into a gaseous current-type classifier to give fillers for ink jet recording paper having a median diameter, measured by the coulter counter method, of 3.5 μm (Example 1a), 8.0 μm (Example 1b), and 13.0 μm (Example 1c). The median diameter, oil absorption, refractive index, moisture absorption, pore volume, and acid strength distribution of each of the resulting fillers and the characteristics of a recorded image on a sheet of paper coated with the filler were examined. The results are shown in Tables 1 and 2.

Testing Methods (1) Median diameter

The median diameter was measured under the following conditions using a coulter counter (model TA-II made by Coulter Electronics Co., U.S.A.). About 0.5 g of the sample was taken into a 200 ml beaker, and about 150 ml of deionized water was added. The sample was dispersed for 60 to 90 seconds by ultrasonication (using ULTRASONIC CLEANER B-220).

Several drops of the dispersion were put in 150 ml of an electrolyte solution (ISOTON II) by using a squirt, and the mixture was subjected to the coulter counter, and the particle size distribution of the silica was measured. The following aperture tubes were used for the respective particle size ranges measured.

Aperture tube 50 $\mu$: particle size range 1–20 $\mu$m
Aperture tube 100 $\mu$: particle size range 2–40 $\mu$m The median diameter was determined by reading the 50% diameter in the cumulative particle size distribution chart.

(2) Oil absorption

The oil absorption was measured in accordance with the Method of Testing Pigment in JIS K-5101-19.

(3) Refractive index

Various organic solvents having known rafractive indices were put in test tubes, and aligned in order of increasing refractive indices. The sample powder was added and the test tubes were fully shaken to disperse it. The refractive index of the organic solvent which was determined to have the highest transparency by observation with unaided eyes was defined as the refractive index of the sample powder.

The refractive indices of the organic solvents used are tabulated below.

| Organic solvent | Refractive index/°C. |
| --- | --- |
| Cyclohexane | 1.4268/20 |
| Ethylene glycol | 1.4274/20 |
| Ethylene chloride | 1.4443/20 |
| Formamide | 1.4453/22.7 |
| Chloroform | 1.4467/20 |
| Lacquer thinner for nitrocellulose | 1.4485/20 |
| Acetylacetone | 1.4518/18.5 |
| Ethylenediamine | 1.4540/26.1 |
| Cyclohexanol | 1.4606/37 |
| Carbon tetrachloride | 1.4631/15 |
| Liquid paraffin | 1.4753/20 |
| Linseed oil | 1.4806/20 |
| Toluene | 1.4969/20 |
| Xylene | 1.4999/15 |

(4) Moisture absorption

About 1.5 g of the sample was put in a weighing bottle, and dried at 150° C. for 3 hours and its weight was accurately measured. The sample was then put in a desiccator which had been adjusted to a relative humidity of 90%. The desiccator was left to stand in a constant-temperature vessel kept at 25° C.

The weight increase of the sample was measured at each of the measuring times, and the moisture absorption was calculated from the following equation.

$$\text{Moisture absorption (\%)} = \frac{\text{Weight increase of the sample (g)}}{\text{Weight of the sample (g)}} \times 100$$

Figure 1:
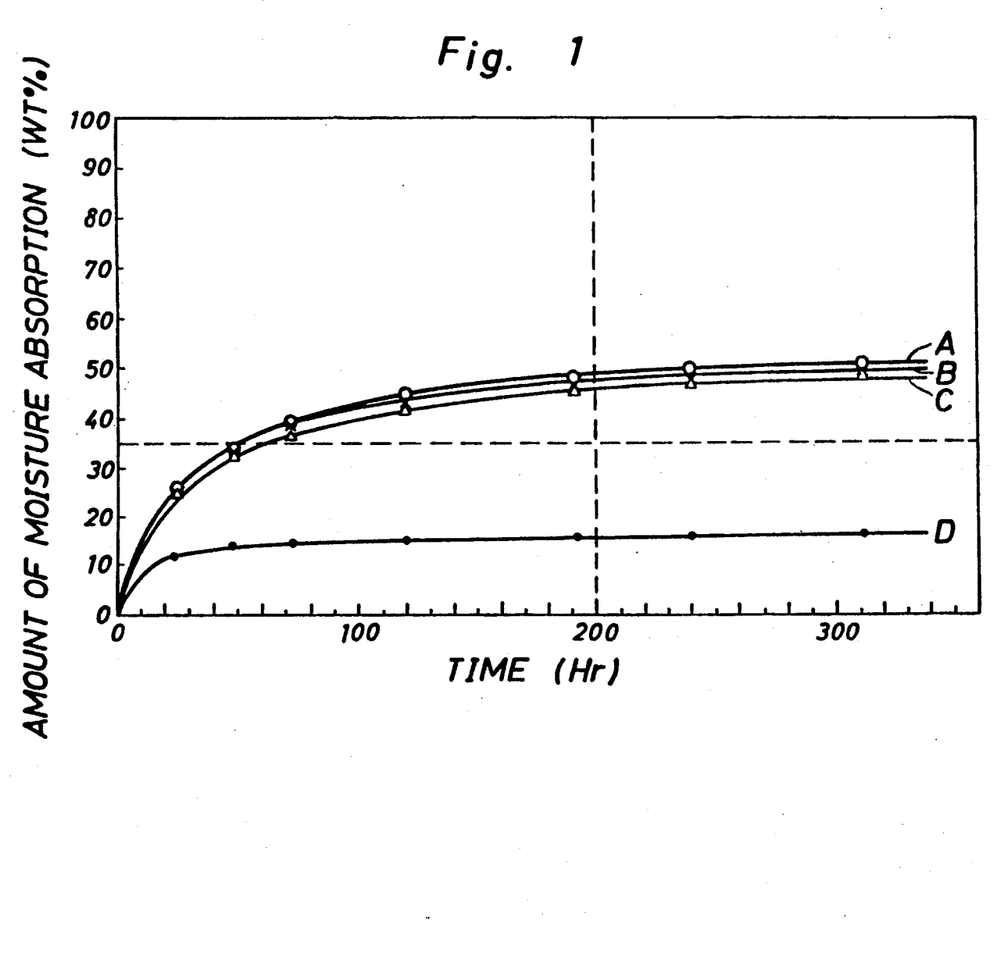
FIGS. 1 and 2 are diagrams showing the relation between the time elapsed (abscissa) and the increase of moisture absorption of a filler (ordinate) when the filler is placed in an atmosphere kept at a relative humidity of 90%, the curves A, B, C, D, E, F, G and H referring to the fillers obtained in Examples 1a, 1b and 1c and used in Comparative Examples 1, 2, 3, 4 and 5, respectively.
Figure 2:
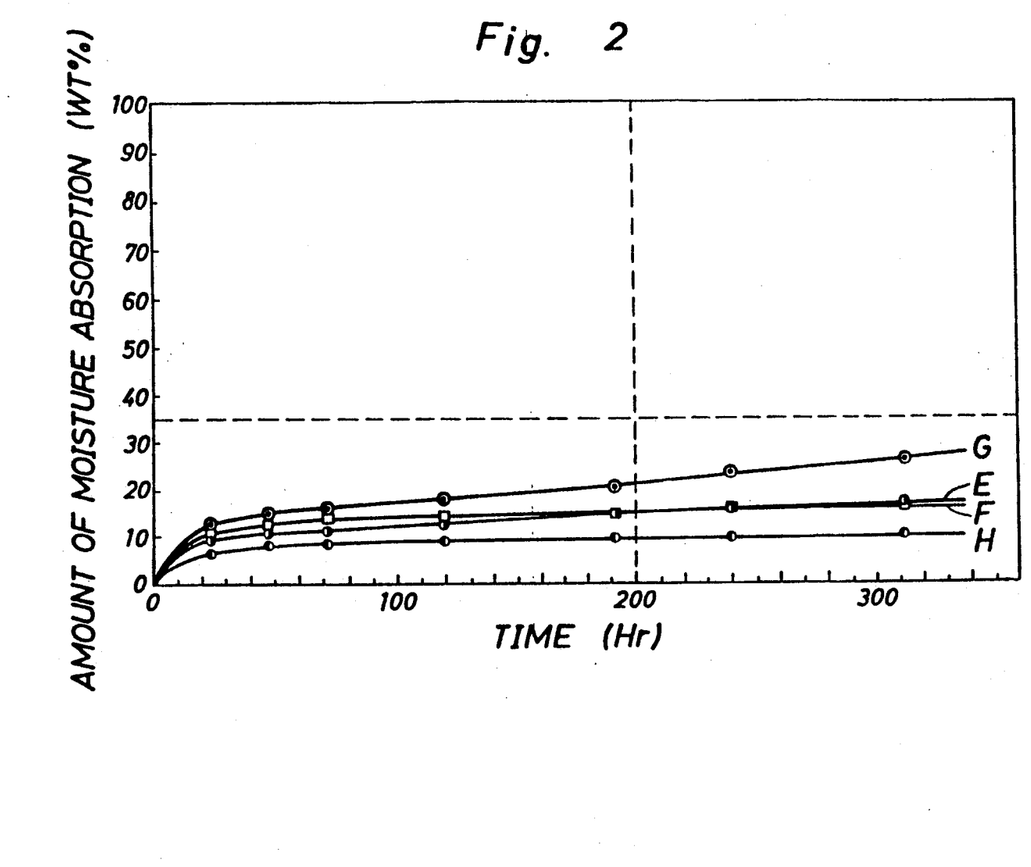

The measuring times were 24, 48, 72, 120, 192, 240, and 312 hours. The variations in moisture absorption for the respective times were plotted in graphs (see FIGS. 1 and 2). By an interpolation method, the moisture absorption corresponding to moisture absorption for 200 hours was determined.

(5) Pore volume

The pore volume was measured by using a surface area adsorption device in accordance with the BET method. This is based on the adsorption of nitrogen gas at the liquid nitrogen temperature ($-196°$ C.). Specifically, by using the amount of adsorption at a relative pressure P/PO of 1 in the adsorption isotherm, the total pore volume of pores having a pore diameter of not more than 300 Å was determined.

This was measured by an n-butylamine titration method.

About 0.5 g of the sample was put in a 50 ml Erlenmeyer flask having a ground stopper, dried at 150° C. for 3 hours, and accurately weighed. About 10 ml of a special grade benzene solution dehydrated by distillation was added, and the following Hammett's indicators were added dropwise to form acidic colors.

| Hammett's indicate | $H_0$ | Acidic color | Basic color |
| --- | --- | --- | --- |
| 4-benzeneazo-diphenylamine | +1.5 | orange | yellow |
| p-dimethylamino-azobenzene | +3.3 | deep orange | light yellow |
| Methyl Red | +4.8 | purple | light yellow |

For example, when p-dimethylaminoazobenzene (dimethyl yellow) is adsorbed on solid acid A, deep organge as an acidic color is formed. This is in accordance with the following reaction.

(light yellow)     (deep orange)

When n-butylamine is added, the acid site is neutralized to form a light yellow color which is a basic color.

In the measurement, titration with N/20 n-butylamine was carried out over about 2 days, and from the amount of the n-butylamine required, the amount of the solid acid was calculated.

$A = F \times V/20 \times W$ where
A: the amount of the solid acid (mmoles/g)

F: the factor of N/20 n-butylamine
V: the amount titrated (ml)
W: the weight of the sample (g)

The end point of the titration was determined as follows on the basis of the colors in "Color Chips, edited by Japan Standards Association (in accordance with JIS Z-8721).

| $H_0$ | Color |
|---|---|
| +1.5 | 7.5 Y |
| +3.3 | 5 Y |
| +4.8 | 5 Y |

The acid strength distribution was determined by the following procedure.

When titration is carried out using 4-benzeneazodiphenylamine as an indicator, the amount of the acid having an acid strength function of up to +1.5 can be measured. When titration is carried out by using p-dimethylaminoazobenzene as an indicator, the amount of the acid having an acid strength function of up to +3.3 can be measured. By performing the titration using the other indicators, the acid strength distribution of the solid acid can be determined.

(7) Characteristics of a recorded image on paper coated with the filler (7-1) Method of preparing the coated paper To 10 g (after drying at 110° C.) of the filler was added 25 g of a 15% aqueous solution of polyivinyl alcohol (PVA 117, a product of Kuraray Inc.) as a binder. Water was further added to make the total amount 60 g. The mixture was fully stirred to form a coating dispersion. The coating dispersion was coated on a sheet of base paper (paper for PPC) having a basis weight of 45 g/m² at a rate of about 10 g/m² to obtain a recording paper.

(7-2) Method of ink jet recording

Figure 3:
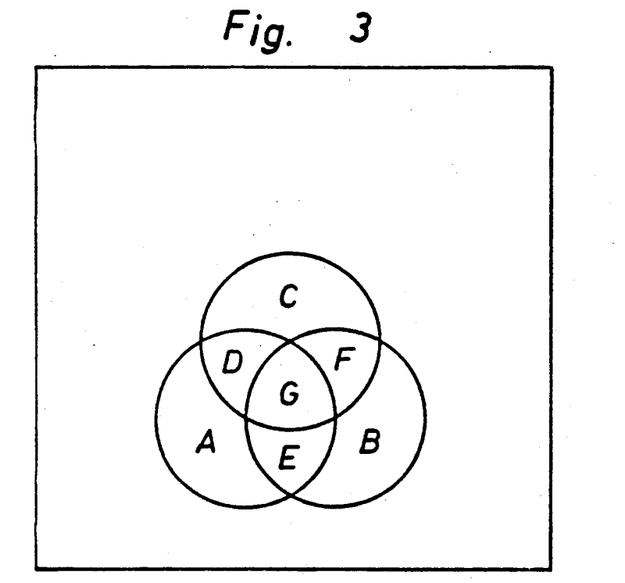
FIG. 3 shows a test pattern on an image-forming test paper obtained by the testing method (7) described hereinafter, A, B, C, D, E, F and G respectively showing a red surface, a blue surface, a yellow surface, an orange surface, a purple surface, a green surface and a black surface.

The coated paper obtained by the method of (7-1) was set on an ink jet color image printer (Model 10-0700 made by Sharp Corporation) connected to a small-sized computer (PC-9801 VMO made by Nihon Electrical Co., Ltd.), and a hard copy having the test pattern shown in FIG. 3 was obtained.

(7-3) Characteristics of the recorded image

The surface of the hard copy obtained by the method of (7-2) which was printed in seven colors A (red), B (blue), C (yellow), D (orange), E (purple), F (green), G (black) in English and Japanese characters was observed with unaided eyes and also by a magnifying glass (stand microscope, magnification 50×). The clearness of the image was comprehensively evaluated by the following evaluation standards by considering its chroma and density and the absence or presence of blurring.

| Evaluation symbol | Standards of Evaluation |
|---|---|
| ⊙ | The chroma and density were considerably high, and no ink blurring occurred. The dots in the copy were very clear. |
| ○ | The chroma and density were high, and ink blurring hardly occurred. The dots in the copy were clear. |
| Δ: | The chroma and density were low, or ink blurring occurred. The copy was not so clear. |
| X: | The chroma and density were low and ink blurring occurred. The copy was |

| Evaluation symbol | Standards of Evaluation |
|---|---|
| | not clear. |

Figure 4:
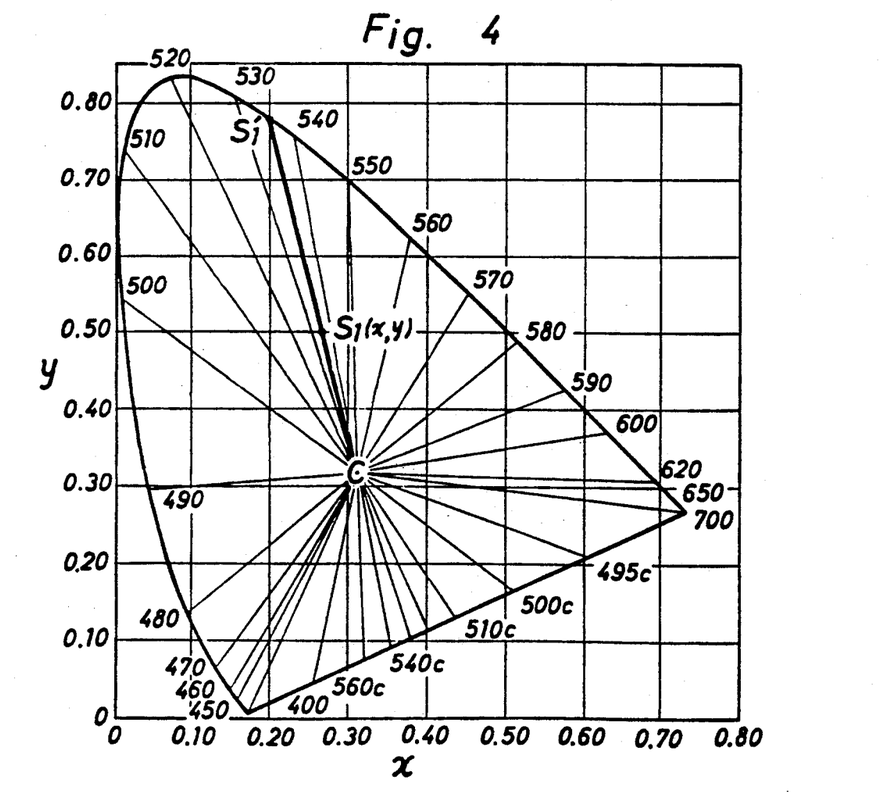
FIG. 4 is a diagram showing the relation between the dominant wavelengths and a chromaticity diagram in accordance with the XYZ colorimetric system based on the 2• visual field described in the testing method (7).

An integrating sphere device (model TIS-341) was fitted to a visible ultraviolet spectrophotometer (model UVIDEC-650 made by Nihon Bunko Co., Ltd.). The red, blue and yellow surfaces A, B and C of the test pattern shown in FIG. 3 were cut off and these paper pieces were placed on a reflecting plate holder for samples. Non-printed coated surface of the same coated paper was cut off, and the cut pieces were placed on a reflecting plate holder for controls. The reflectances of these paper pieces were measured at 10 nm intervals within a wavelength region of 380 to 780 nm. By a method substantially in accordance with JIS Z-8722, the chromaticity coordinates x, y of the respective colors were determined, and the relation between the dominant wavelength and the chromaticity diagram in accordance with the XYZ colorimetric system based on a 2° visual field was plotted (FIG. 4). The dominant wavelength $\lambda_d$ (or the complementary wavelength $\lambda_c$) (nm) and the excitation purity Pe (%) were determined from this chromaticity coordinate plot. At this time, the dominant wavelength $\lambda_d$ (or the complementary wavelength $\lambda_e$) represents a color hue, and a high excitation purity Pe shows a high chroma.

Method of determining the dominant wavelength and excitation purity:

The point (C) in the chromaticity diagram shown in FIG. 4 represents the chromaticity coordinates of an achromatic color where x=0.3101 and y=0.3163. In the case of a color whose chromaticity coordinates are represented by the point $S_1$ within an area surrounded by a straight line RC, a straight line VC and the spectrum locus, the wavelength corresponding to an intersecting point $S'_1$ between the extension of a straight line $CS_1$ and the spectrum locus is determined from FIG. 4. This wavelength denotes the dominant wavelength of that color and expressed by the symbol $\lambda_d$.

In the case of a color whose chromaticity coordinates are represented by a point $S_2$ within a triangle CRV, the wavelengths corresponding to an intersecting point $S_2$ between the extension of a straight line $S_2C$ and the spectrum locus is determined from FIG. 4. This wavelength denotes the complementary wavelength of that color and is expressed by the symbol $\lambda_e$.

The excitation purity Pe of the color whose chromaticity coordinates are represented by the point $S_1$ in FIG. 4 is calculated from the following equation and % is attached to the calculated value.

$$Pe = \frac{x - x_c}{x_\lambda - x_c} \times 100 \quad (1)$$

or $$Pe = \frac{y - y_c}{y_\lambda - y_c} \times 100 \quad (2)$$

wherein x, y: the coordinates at the point $S_1$,
$x_c$, $y_c$: the coordinates at the point C
$x_\lambda$, $y_\lambda$: the coordinates at the point $S'_1$ The excitation purity Pe of the color whose chromaticity coordinates are represented by the point $S_2$ is calculated by the following equation, and % is attached to the calculated value.

$$P_e = \frac{x - x_c}{x_p - x_c} \times 100 \quad (3)$$

or $$P_e = \frac{y - y_c}{y_p - y_c} \times 100 \quad (4)$$

wherein
- x, y: the coordinates at the point $S_2$,
- $x_c$, $y_c$: the coordinates at the point C
- $x_p$, $y_p$: the coordinates at the point $S'_2$ (the intersecting point between the extension of the straight line $CS_2$ and the pure purple locus)

Note: Pe is calculated by using the equation in which the absolute value of the denominator or the numerator is larger.

One Example of a Method of Determining the Excitation Purity and the Dominant Wavelength If the tristimulus values obtained by measuring the sample are X=40.14, Y=76.50 and Z=34.25, the chromaticity coordinates are x=0.266 and y=0.507. The chromaticity coordinates are determined as the point ($S_1$) in FIG. 4, and then the chromaticity coordinates of an achromatic color (x=0.3101, y=0.3163), as point C. C and $S_1$ are connected by a straight line. The straight line is further extended and the point intersecting the spectrum locus is determined as $S'_1$. $S'_1$ exists at a position of 534 nm on the spectrum lolcus. In other words, the dominant wavelength $\lambda_d$ is 534 nm. Since from FIG. 4, the coordinates of $S'_1$ are $x_\lambda$=0.200 and $y_\lambda$=0.785, the excitation purity Pe i calculated as 40.7% from equation (2).

$$\frac{0.507 - 0.3163}{0.785 - 0.3163} \times 100$$

Accordingly, the color of the sample is expressed by a dominant wavelength $\lambda_d$ of 534 nm and an excitation purity Pe of 40.7%.

TABLE A

| Dominant wavelength and color hues | | |
|---|---|---|
| Dominant wavelength (nm) | Hue | Abbreviation |
| 498c–700–618 | red | R |

TABLE A-continued

| Dominant wavelength and color hues | | |
|---|---|---|
| Dominant wavelength (nm) | Hue | Abbreviation |
| 618–586 | orange | O |
| 686–571 | yellow | Y |
| 571–531 | yellowish green | YG |
| 531–498 | green | G |
| 498–482 | bluish green | BG |
| 482–435 | blue | B |
| 435–400–578c | bluish purple | V |
| 578c–528c | purple | P |
| 528c–498c | reddish purple | RP |

COMPARATIVE EXAMPLE 1

Mizukasil P-526 produced by Mizusawa Chemical Industry Co., Ltd. was used as the filler composed of amorphous silica.

COMPARATIVE EXAMPLE 2

Nipsil E-200A produced by Nippon Silica Co., Ltd., commercially available, was used as the filler composed of amorphous silica.

COMPARATIVE EXAMPLE 3

Carplex FPS-701 produced by Shionogi Pharmaceutical Co., Ltd., commercially available, was used as the filler composed of amorphous silica.

COMPARATIVE EXAMPLE 4

Fine Seal X-80 produced By Tokuyama Soda Co., Ltd., commercially available, was used as the filler composed of amorphous silica.

COMPARATIVE EXAMPLE 5

Aerosil 300 produced by Nippon Aerosil Co., Ltd., commercially available, was used as the filler composed of amorphous silica.

The median diameter, oil absorption, refractive index, moisture absorption, pore volume, and acid strength distribution of each of the fillers used in Comparative Examples 1 to 5 and the characteristics of a recorded image on a sheet of paper coated with the filler were examined by the methods described hereinabove. The results are shown in Tables 1 and 2.

In Comparative Example 5, the viscosity of the coating solution was extremely high in the preparation of coated paper, and it could not be coated. Accordingly, this fillers is unsuitable for use in preparing ink jet recording paper.

TABLE 1

| | Sample obtained in Example 1a | Sample obtained in Example 1b | Sample obtained in Example 1c | Mizukasil P-526 (Comparative Example 1) | Nipsil E-200A (Comparative Example 2) | Carplex FPS-701 (Comparative Example 3) | Fineseal X-80 (Comparative Example 4) | Aerosil 300 (Comparative Example 5) |
|---|---|---|---|---|---|---|---|---|
| Median diameter ($\mu$) | 3.5 | 8.0 | 13.0 | 2.8 | 3.0 | 3.2 | 2.7 | 6.2 |
| Oil absorption (ml/100 g) | 236 | 231 | 228 | 208 | 212 | 209 | 173 | 266 |
| Refractive index | 1.4631 | 1.4631 | 1.4631 | 1.4485 | 1.4485 | 1.4467 | 1.4485 | 1.4631 |
| Pore volume (cc/g) | 1.665 | 1.670 | 1.675 | 0.236 | 0.293 | 0.284 | 0.378 | 0.173 |
| Moisture absorption (%) (90% RH, 25° C., 200 hours) | 49.1 | 47.9 | 46.0 | 16.0 | 15.1 | 15.0 | 21.0 | 9.7 |
| Acid strength distribution (mmols/g) | | | | | | | | |
| $+1.5 < H_0 \leq +3.3$ | 0.022 | 0.025 | 0.026 | 0.006 | 0.030 | 0.050 | 0.069 | 0.015 |
| $+3.3 < H_0 \leq +4.8$ | 0.294 | 0.303 | 0.306 | 0.089 | 0.138 | 0.071 | 0.293 | 0.250 |

TABLE 2

| | Characteristics of the recorded image | | | | | | | | | |
|---|---|---|---|---|---|---|---|---|---|---|
| | Evaluation by observation with unaided eyes | | | | | | | Excitation purity (Pe. %) and (Dominant wave length ($\lambda_d$, nm)) | | |
| | A red | B blue | C yellow | D orange | E purple | F green | G black | A red | B blue | C yellow |
| Example 1a | ○ | ● | ● | ○ | ○ | ● | ○ | 55.4 (498c) | 60.2 (484) | 70.4 (573) |
| Example 1b | ● | ● | ● | ● | ● | ● | ● | 58.5 (496c) | 62.1 (484) | 73.7 (573) |
| Example 1c | ● | ● | ● | ● | ● | ● | ● | 60.5 (495c) | 61.4 (484) | 74.3 (573) |
| Comparative Example 1 | △ | △ | △ | X | X | X | △ | 48.7 (501c) | 52.7 (484) | 58.1 (574) |
| Comparative Example 2 | △ | △ | △ | X | △ | X | △ | 50.9 (499c) | 54.5 (483) | 61.4 (573) |
| Comparative Example 3 | ○ | ○ | ○ | △ | △ | △ | △ | 52.8 (498c) | 56.2 (483) | 65.5 (573) |
| Comparative Example 4 | ○ | ○ | ○ | △ | △ | △ | ○ | 53.1 (498c) | 56.9 (483) | 66.2 (573) |

What is claimed is:

1. An ink jet recording element which comprises a paper substrate and a layer of a filler coated on the surface of the substrate. wherein said filler comprises amorphous silica having (i) a median diameter. measured by the Coulter counter method, of 2 to 15 μm, (ii) an oil absorption of at least 180 ml/100 g, (iii) a refractive index, measured by the solvent method, of at least 1.450, (iv) a specific surface area of 280 to 500 m²/g, (v) a pore volume, measured by the nitrogen adsorption method, of more than 1.30 cc/g, and (vi) a moisture absorption, measured when it is caused to absorb moisture for 200 hours at a relatively humidity of 90% and a temperature of 25° C., of at least 35%.

2. An ink jet recording element as set forth in claim 1, wherein the amorphous silica is coated in an amount of 3 to 20 g/m².

3. An ink jet recording element as set forth in claim 1 wherein the pore volume, measured by the nitrogen absorption method. is not greater than 1.80 cc/g.

4. An ink jet recording element which comprises a paper and a filler incorporated in the paper in an amount of 1 to 20% by weight based on the weight of the paper fibers, wherein said filler comprises amorphous silica having (i) a median diameter, measured by the Coulter counter method, of 2 to 15 μm, (ii) an oil absorption of at least 180 ml/100 g, (iii) a refractive index, measured by the solvent method, of at least 1.450, (iv) a specific surface area of 280 to 500 m²/g, (v) a pore volume, measured by the nitrogen adsorption method, of more than 1.30 cc/g, and (vi) a moisture for 200 hours at a relative humidity of 90% and a temperature of 25° C., of at least 35%.

5. An ink jet recording element as set forth in claim 4 wherein the pore volume, measured by the nitrogen absorption method, is not greater than 1.80 cc/g.

* * * * *